United States Patent [19]
McCay et al.

[11] Patent Number: 6,049,953
[45] Date of Patent: Apr. 18, 2000

[54] FASTENER ASSEMBLY

[75] Inventors: Gary Jeffrey McCay, Zillmere; Lynda Gasbarri, Fairfield, both of Australia

[73] Assignee: McCay Holdings PTY., Ltd., Queensland, Australia

[21] Appl. No.: 09/028,547

[22] Filed: Feb. 24, 1998

[51] Int. Cl.[7] .................................................. A44B 1/04
[52] U.S. Cl. .............................. 24/302; 24/306; 24/598.7
[58] Field of Search ............................ 24/298, 300–302, 24/598.7, 600.9, 601.2, 601.7; 128/DIG. 15; 224/901.4

[56] References Cited

U.S. PATENT DOCUMENTS

| | | | |
|---|---|---|---|
| 4,158,907 | 6/1979 | Spinosa et al. | 24/600.9 |
| 4,862,563 | 9/1989 | Flynn | 24/442 |
| 5,076,288 | 12/1991 | Millard et al. | 128/DIG. 15 |
| 5,136,759 | 8/1992 | Armour, II | 24/442 |
| 5,160,074 | 11/1992 | Coates | 224/901.4 X |

FOREIGN PATENT DOCUMENTS

| | | | |
|---|---|---|---|
| 1679483 | 7/1982 | Australia . | |
| 5743386 | 5/1986 | Australia . | |
| 2166466 | 8/1973 | France . | |
| 3431310 | 7/1985 | Germany | 24/601.2 |

*Primary Examiner*—James R. Brittain
*Attorney, Agent, or Firm*—Quirk & Tratos; Philip J. Anderson

[57] ABSTRACT

A strap 10 employing at opposite ends thereof respective fastener assemblies 11, each flexible fastener assembly comprising a rigid or a semi-flexible hook member 12 and a locking means in the form of a flexible strap section 13, each hook member 12 has an outer surface covered with a hook fastener material 14 while the inner surface of each of the straps 13 includes a complimentary loop fastener material 15 adapted to engage and hold onto the hook material 14 to form a closed loop.

8 Claims, 2 Drawing Sheets

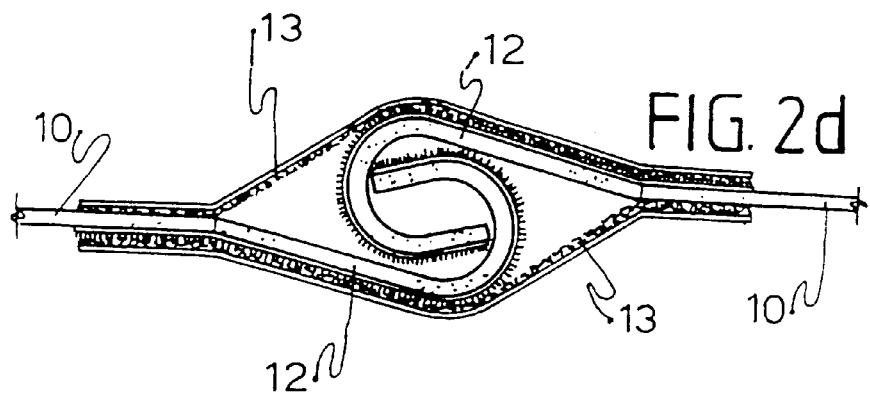
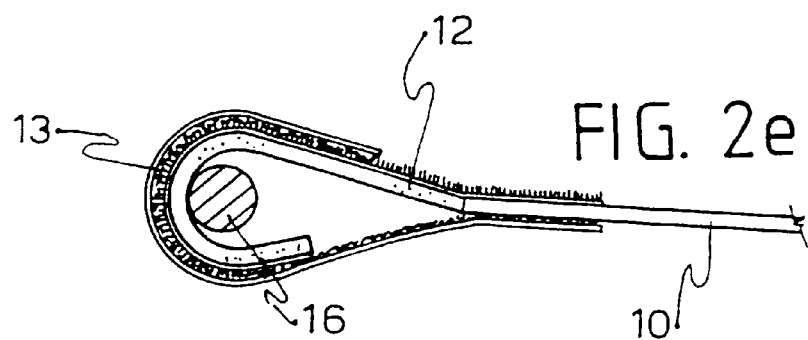
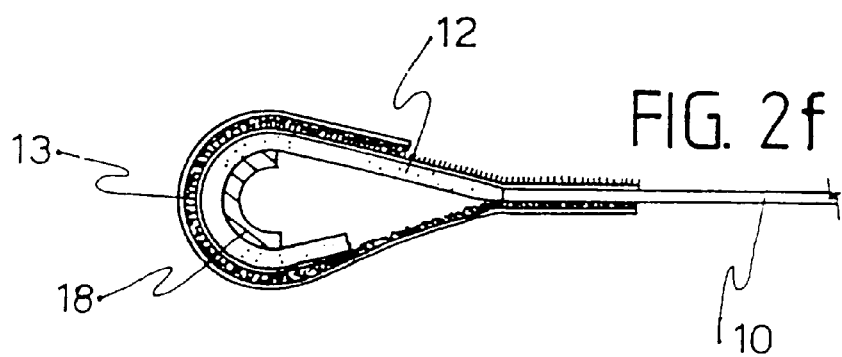

FASTENER ASSEMBLY

TECHNICAL FIELD OF THE INVENTION

This invention relates to a flexible fastener assembly and in particular but not limited to a double ended flexible strap having flexible hook fastener assemblies at each end.

BACKGROUND ART

Present hold-down straps employ plastic coated wire hooks secured at opposite ends of an elastic strap. In use the hooks are prone to be dislodged while the strap is under tension and are therefore dangerous as the hooks can be propelled toward an unsuspecting user.

It is an object of the present invention to provide a flexible fastener assembly that can be used in similar situations to the present hold-down straps but with greater safety.

OUTLINE OF THE INVENTION

In one broad form the present invention resides in a flexible fastener assembly comprising a hook member and flexible locking means engageable with the hook member to form a closed loop in order to in use, inhibit accidental release of the hook.

In one preferred form the present invention resides in a flexible fastener assembly having a semi-flexible hook member and a locking means engageable with the hook member to form a closed flexible loop. The semi-flexible member has a shape defined to facilitate use of the flexible fastener assembly so that the assembly is safe to use but can still use the hooking action to make use simple. The shape typically enables single handed operation of the assembly. In another form the hook member is rigid being adapted to cooperate with the locking means.

The hook member and the locking means preferably form bifurcated ends of a strap, the hook member providing one end and the locking means the other. In one preferred form the locking means is a tab or strap portion having a hook attachment means so that the locking means can be selectively fastened to the hook member to enable the size of the loop so formed to be varied. The hook member preferably includes locking means attachment means on an outer surface of the hook member so that the locking means operatively engages the outer surface of the hook member when the two are engaged to form the loop. Typically the hook includes a base, a shank and a hook section, and the locking means comprising hook and loop fasteners covering a major portion of the outer surface of the hook member. Typically the fasteners extend from the base at least the entire length of the shank of the hook member.

In one particularly preferred form the flexible fastener assembly employs hook and loop type fasteners (hook and pile) Velcro® of the type forming complementary fasteners of the hook and loop type being carried on an outer surface of the hook member and on an inner surface of the locking means. Thus the outer surface of the hook member engages the inner surface of the locking means to form the loop.

In some cases the flexible hook will be made integral with and of the same material as the strap on other occasions the hook will be made separately and secured to the strap. In the latter case it is preferable to employ some form of reinforcement between the hook material and the strap adjacent the juncture of the flexible hook and strap. Typically this can involve supporting stitching or a rigid or semi-rigid support member applied to the juncture and through which fasteners pass.

The hook members can be of any shape but are preferably made from flat, thin relatively wide material.

In order that the present invention can be more readily understood and be put into practical effect reference will now be made to the accompanying drawings and wherein:

BRIEF DESCRIPTION OF THE DRAWINGS

FIGS. 2d to 2f illustrate examples of how rigid hook fastener assemblies according to the present invention can be used.

Figure 1:
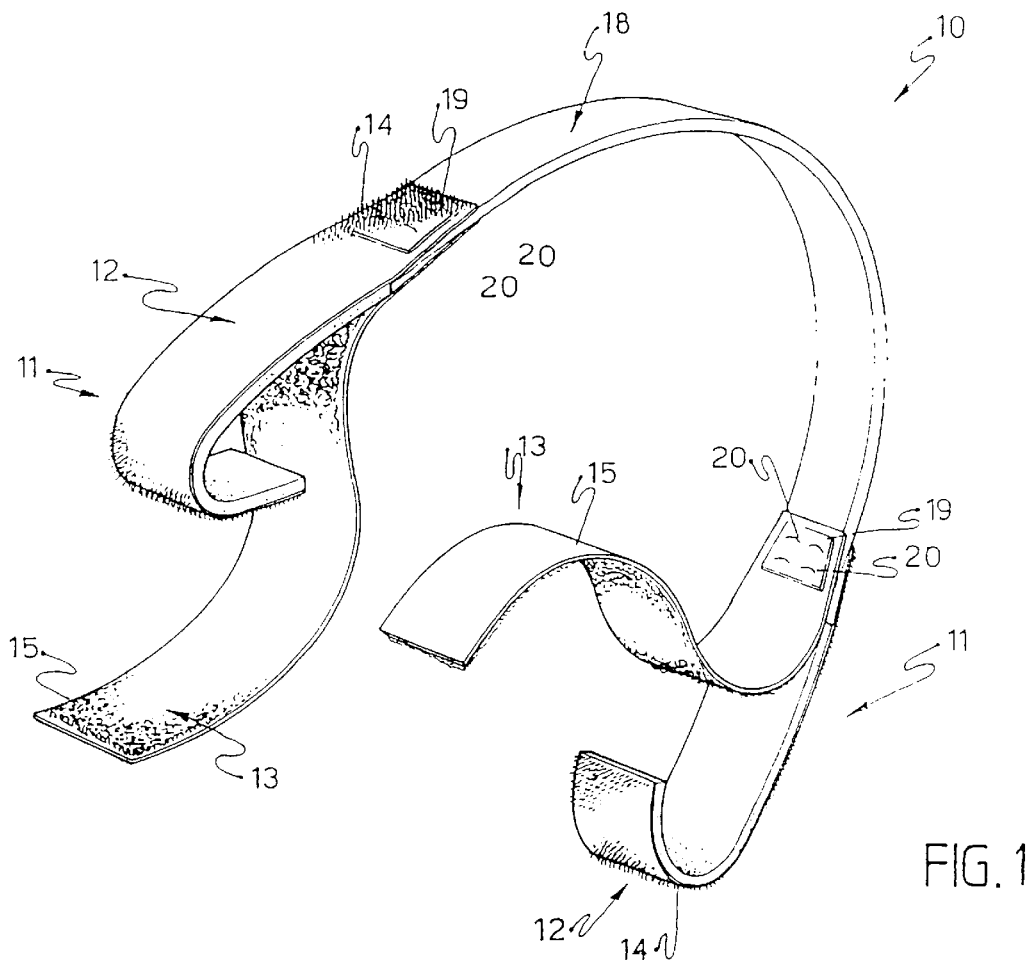
FIG. 1 is a perspective view illustrating a strap employing fastener assemblies according to one preferred embodiment of the present invention.

Referring to the drawings and initially to FIG. 1 there is illustrated a strap 10 employing at opposite ends thereof respective fastener assemblies 11, each flexible fastener assembly comprising a rigid or a semi-flexible hook member 12 and a locking means in the form of a flexible strap section 13, each hook member 12 has an outer surface covered with a hook fastener material 14 while the inner surface of each of the straps 13 includes a complimentary loop fastener material 15 adapted to engage and hold onto the hook material 14 to form a closed loop. In the case of a rigid hook the hook 12 can be made from metal while in the case of a semi-flexible hook a flexible natural rubber or a plasticised PVC is suitable.

It will be appreciated that where the hook members 12 are semi-flexible the hook member can be used like a hook in the usual way and that upon the hook member 12 being hooked over in object and then the strap 13 engaged with the hook member the two form a loop around the object and the hook member 12 and the strap 13 can be pulled and the hook 12 will simply flex in response to the applied tension.

It will be appreciated that the use of a semi-flexible hook member 12 is safer than using the metal hooks known in the prior art while use of the metal hook and accompanying strap section 13 also improves safety.

It will also be appreciated that the arrangement illustrated in FIG. 1 is not merely a hook and loop fastener but includes a semi-flexible hook element 12 enabling and facilitating the use of a hooking action in order to engage the flexible hook fastener assembly in place. This hooking action and then subsequently engaging the strap 13 can be a single handed action in both cases.

Figure 2A:
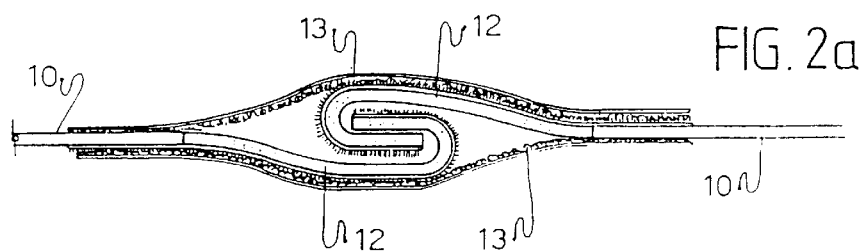
FIGS. 2a to 2c illustrate examples of how flexible hook fastener assemblies according to the present invention can be used.
Figure 2B:
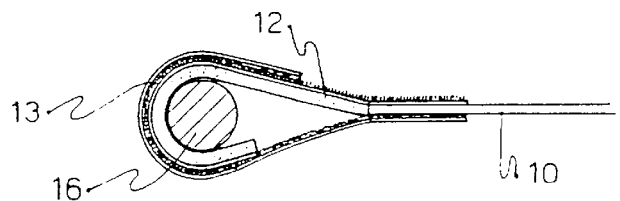
Figure 2C:
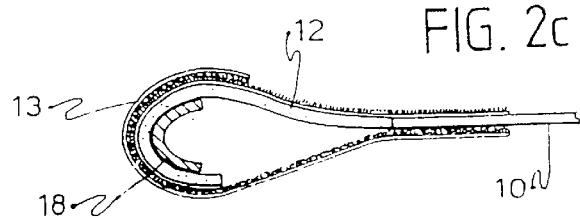

Examples of how the fastener assemblies of FIG. 1 when equipped with a flexible hook may be used are illustrated in FIGS. 2a to 2c. As can be seen in FIG. 2a two straps 10 have their respective hooks 12 hooked together and the straps 13 are engaged as shown thus resulting in a complete loop or two separate straps can be joined together.

Likewise in FIG. 2b the hook 12 is initially positioned around a bar 16 and the strap 13 engaged with the hook to form the loop as described previously and the strap 10 is thus secured in place with the semi-flexible hook adopting the shape of the bar 16.

The strap 10 can be made from elastic material or can include adjustable buckles or any other suitable arrangement commonly utilised in straps to their normal advantage.

FIG. 2c illustrates how the fastener assembly 11 might be utilised to be wrapped around the strap 10. It will be appreciated of course that the strap 10 can be looped back upon itself with the hook member 12 looping around any portion of the strap 10, say for example at 18 in FIG. 1 thus forming an even larger loop to wrap around relatively large objects.

Other modifications include a thin plastic support plate illustrated in FIG. 1 at 19 which bridges across the juncture between the flexible hook and the strap to provide added strength and to limit any tearing through of staples 20 that may occur due to prolonged use and thereby increases the life of the assembly particularly where an elastic strap is being used.

FIGS. 2d to 2f are similar to FIGS. 2a to 2c except rigid hooks are used.

There will of course be many other uses and applications of the fastener assembly illustrated in the drawings apparent to those skilled in the art and therefore whilst the above has been given by way of illustrative example of the present invention many variations and modifications will be apparent to those skilled in the art without departing from the broad ambit and scope of the invention as set forth in the appended claims.

We claim:

1. A fastener assembly comprising: a hook member and flexible locking means both coupled to one end of an elongate strap, the locking means being engageable with the hook member to form a closed self-supporting loop to resist release of the hook, where the hook member is a self-supporting flexible hook member having an outer surface extending from a flat base through a flat shank section to a hook section at its end, a hook and pile fastener being secured to the outer surface of the hook member and extending from the base and along the shank, the locking means comprising a flexible tab carrying a complementary hook and pile fastener and being adapted to engage the hook and pile fastener along said shank to form the loop.

2. A fastener assembly comprising: a hook member and flexible locking means both coupled to one end of an elongate strap, the locking means being engageable with the hook member to form a closed self-supporting loop to resist release of the hook, where the hook member is a rigid hook member having an outer surface extending from a flat base through a flat shank section to a hook section at its end, a hook and pile fastener being secured to the outer surface of the hook member and extending from the base and along the shank, the locking means comprising a flexible tab carrying a complementary hook and pile fastener and being adapted to engage the hook and pile fastener along said shank to form the loop.

3. A fastener assembly comprising: a hook member and flexible locking means both coupled to one end of an elongate strap, the locking means being engageable with the hook member to form a closed self-supporting loop to resist release of the hook, wherein the hook member and the locking means form bifurcated ends of said strap, the hook member providing one of said bifurcated ends and the locking means the other and both having generally planar bases and opposed flat inner and outer surfaces, the locking means comprising a tab marginally longer than the hook member, the hook member and the tab being fastened together at their bases in a substantially common plane so that their bases overlay one another and the tab opposing the hook so that a contact portion of the inner surface of the tab overlays a confronting contact portion of the outer surface of the hook member essentially along a common line, the respective contact portions having complementary fastener means covering the entire surface thereof and enabling the extent of contact between said contact portions of said tab and said hook member in said loop to change in order to vary the size of said supporting loop.

4. A fastener assembly comprising: a hook member and flexible locking means both coupled to one end of an elongate strap, the locking means being engageable with the hook member to form a closed self-supporting loop to resist release of the hook wherein said hook member and said locking means include respective free ends and bases, the bases being secured together and also secured to the strap, there being provided strengthening means at the juncture between the strap and the hook member, said means being connected to the bases and the strap and bridging the bases and the strap so as to strengthen the joinder between the bases and strap.

5. A flexible fastener assembly according to claim 4 wherein the means bridging the bases and the strap comprising a plate member.

6. A fastener assembly comprising a hook member and flexible locking means, the locking means being engageable with the hook member to form a closed self supporting loop in order to, in use, inhibit accidental release of the hook, the hook member being a self supported flexible hook member having an outer surface extending from a flat base through a flat shank section to a hook section at its end, a hook and pile fastener being secured to the outer surface of the hook member and extending from the base and along the shank, the locking means comprising a flexible tab carrying complementary hook and loop fastener means and being adapted to engage the hook and pile fastener along said shank to form the loop.

7. A fastener assembly according to claim 6 wherein the hook member and the locking means form bifurcated ends of said assembly, the hook member providing one of said bifurcated ends and the locking means the other and both having generally planar bases and opposed flat inner and outer surfaces, the locking means comprising a tab marginally longer than the hook member, the hook member and the tab being fastened together at their bases in a substantially common plane so that their bases overlay one another and the tab opposing the hook so that a contact portion of the inner surface of the tab overlays a confronting contact portion of the outer surface of the hook member essentially along a common line, the respective contact portions having complementary fastener means covering the entire surface thereof and enabling the extent of contact between said contact portions of said tab and said hook member in said loop to be selectively changed in order to selectively vary the size of said self supporting loop.

8. A fastener assembly according to claim 6 wherein the hook member and locking means form bifurcated ends for the assembly, the hook member providing one of said bifurcated ends and the locking means the other and both having generally planar bases and opposed flat inner and outer surfaces, the locking means comprising a tab marginally longer than the hook member, the hook member and the tab being fastened together at the bases in a substantially common plane so that their bases overlay one another and the tab opposing the hook member so that a contact portion of the inner surface of the tab overlays a confronting contact portion of the outer surface of the hook member substantially along a common line, the respective contact portions having complementary releasable fastener means covering the entire surface thereof and enabling the extent of the contact between said contact portions of said tab and hook member in said loop to be selectively changed in order to vary the size of said self-supporting loop.

* * * * *